US008481221B2

(12) United States Patent
Yoon et al.

(10) Patent No.: US 8,481,221 B2
(45) Date of Patent: Jul. 9, 2013

(54) FUEL CELL SYSTEM

(75) Inventors: Seong-Kee Yoon, Suwon-si (KR);
Young-Soo Joung, Gyeonggi-do (KR);
Jung-Kum Park, Suwon-si (KR);
Hye-Jung Cho, Gyeonggi-do (KR);
In-Seob Song, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 502 days.

(21) Appl. No.: 12/759,096

(22) Filed: Apr. 13, 2010

(65) Prior Publication Data

US 2011/0059381 A1 Mar. 10, 2011

(30) Foreign Application Priority Data

Sep. 7, 2009 (KR) ........................ 10-2009-0084180

(51) Int. Cl.
*H01M 8/04* (2006.01)
(52) U.S. Cl.
USPC ......................................... 429/439; 502/400
(58) Field of Classification Search
USPC ......................................... 429/439; 502/400
See application file for complete search history.

(56) References Cited

U.S. PATENT DOCUMENTS

| 7,604,891 | B2 | 10/2009 | Hong |  |
|---|---|---|---|---|
| 7,879,473 | B2* | 2/2011 | Nakamura et al. | 429/428 |
| 2006/0024552 | A1* | 2/2006 | Fujita et al. | 429/34 |
| 2007/0166579 | A1 | 7/2007 | Kim et al. |  |
| 2007/0231657 | A1* | 10/2007 | Sato et al. | 429/34 |
| 2007/0287054 | A1* | 12/2007 | Ueda et al. | 429/34 |
| 2010/0178594 | A1* | 7/2010 | Kabasawa | 429/515 |

FOREIGN PATENT DOCUMENTS

| JP | 10-321246 | 12/1998 |
|---|---|---|
| JP | 2002-208422 | 7/2002 |
| JP | 2003-208912 | 7/2003 |
| JP | 2005-129334 | 5/2005 |
| KR | 10-2006-0019251 | 3/2006 |
| KR | 10-2007-0056296 | 6/2007 |
| KR | 10-2007-0076097 | 7/2007 |

OTHER PUBLICATIONS

KIPO Office action dated Apr. 20, 2011, for Korean priority Patent application 10-2009-0084180, noting listed references in this IDS.
Patent Abstracts of Japan, and English machine translation of Japanese Publication 2002-208422, listed above, 19 pages, Jul. 26, 2002.
Patent Abstracts of Japan, and English machine translation of Japanese Publication 2003-208912, listed above, 26 pages, Jul. 25, 2003.

* cited by examiner

*Primary Examiner* — Mark F Huff
*Assistant Examiner* — Monique Wills
(74) *Attorney, Agent, or Firm* — Christie, Parker & Hale, LLP

(57) ABSTRACT

A fuel cell system includes: a fuel supply unit supplying a fuel; an air supply unit supplying air; a stack including a membrane electrode assembly (MEA) having an air path and a fuel path; a gas-liquid separator connected to an outlet of the fuel path and an outlet of the air path for separating gas-liquid into high-temperature liquid and moisture gas; a mixer mixing the high-temperature liquid separated by the gas-liquid separator and a fuel supplied from the fuel supply unit and connecting the gas-liquid separator and the MEA; a moisture absorbent connected to the gas-liquid separator to absorb condensed liquid in the high-temperature moisture gas; and a heat exchanger to vaporize the liquid absorbed by the moisture absorbent.

18 Claims, 2 Drawing Sheets

FUEL CELL SYSTEM

CROSS-REFERENCE TO RELATED APPLICATION

This application claims the benefit of Korean Patent Application No. 10-2009-0084180, filed Sep. 7, 2009 in the Korean Intellectual Property Office, the disclosure of which is incorporated herein by reference.

BACKGROUND

1. Field

Aspects of the present invention relate to a fuel cell system. More particularly, aspects of the present invention relate relates to a fuel cell system that can prevent deterioration of performance of constituent elements due to condensed water generated at the outside of the system by minimizing liquid emitted to the outside.

2. Description of the Related Art

A fuel cell system generates power and heat through an electrochemical reaction of hydrogen included in a hydrocarbon-based fuel and separately-supplied oxygen. For example, unlike a polymer electrolyte membrane fuel cell (PEMFC), a direct oxidation fuel cell (typically referred to as a direct methanol fuel cell, DMFC) system is directly supplied with an alcohol-based fuel. The DMFC system generates electrical energy from an electrochemical reaction of the hydrogen included in the fuel and air that is supplied separately, without using hydrogen gas.

The DMFC system may operate in a passive method or an active method. The DMFC system using the passive method is supplied with air in a no-load state rather than depending on a pump or a fan. The DMFC using the active method is supplied with air driven by the pump or fan.

The active DMFC system uses a fuel having a high concentration (for example 100%) of MeOH for increasing the energy weight density. The active DMFC system replenishes the amount of water used in the anode with water generated from the cathode in order to use the fuel. The active DMFC system condenses gas-liquid emitted from the cathode with a desired amount of water in a heat-exchanger to separate the gas-liquid to gas and liquid so as to recover water generated from the cathode. The active DMFC system replenishes the anode by transmitting the separated high-temperature liquid (i.e., water) to the mixer, and emits high-temperature moisture gas to the outside.

The high-temperature moisture gas emitted from the gas-liquid separator is 100% high-temperature moisture and is condensed to a liquid at the outside of the fuel cell system because the temperature of the gas is higher than the external temperature of the fuel cell system. The external condensed water causes inconvenience in the use of the fuel cell system, and may soak into the fuel cell system thereby causing performance deterioration of constituent elements.

The above information disclosed in this Background section is only for enhancement of understanding of the background of the invention and therefore it may contain information that does not form the prior art that is already known in this country to a person of ordinary skill in the art.

SUMMARY

Aspects of the present invention provide a fuel cell system having advantages of preventing generation of condensed water at the external side of the system by condensing and vaporizing high-temperature moisture gas separated by a gas-liquid separator.

A fuel cell system according to an exemplary embodiment of the present invention includes: a fuel supply unit supplying a fuel containing hydrogen; an air supply unit supplying air containing oxygen; a stack including membrane electrode assemblies (MEAs) each having an anode and a cathode at respective sides of a polymer electrolyte membrane forming unit cells and each including a pair of separators respectively forming a fuel path and an air path at the anode and the cathode, connecting an inlet of the fuel path to the fuel supply unit, and connecting an inlet of the air path to the air supply unit; a gas-liquid separator connected to an outlet of the fuel path and an outlet of the air path for separating gas-liquid emitted from the air and fuel paths into high-temperature liquid and high-temperature moisture gas; a mixer mixing the high-temperature liquid separated by the gas-liquid separator and a fuel supplied from the fuel supply unit and connecting the gas-liquid separator and the inlet of the fuel path for supplying the mixture to the fuel path; a moisture absorbent connected to the gas-liquid separator for passing the high-temperature moisture gas separated by the gas-liquid separator to absorb condensed liquid; and a heat exchanger disposed at one side of the moisture absorbent to vaporize the liquid absorbed by the moisture absorbent by passing high-temperature dry air through the moisture absorbent.

According to an aspect of the invention, the heat exchanger may be provided at an emission line that emits the gas-liquid between the outlet of the air path and the gas-liquid separator.

According to an aspect of the invention, the heat exchanger may include a main body performing heat exchange and a fan provided at one side of the main body for supplying low-temperature air flow and emitting high-temperature air flow through the opposite side after the heat exchange is performed in the main body.

According to an aspect of the invention, the moisture absorbent may include ventilation holes for passing the high-temperature dry air flow supplied from the heat exchanger to the outside. The moisture absorbent may further include a microporous structure formed between the ventilation holes for absorbing and vaporizing the liquid. The moisture absorbent may be formed of an absorptive fiber.

A fuel cell system according to another exemplary embodiment of the present invention may further include a case in which the fuel supply unit, the air supply unit, the stack, the gas-liquid separator, the mixer, the moisture absorbent, and the heat exchanger are installed, and an air hole may be formed at one side of the case.

According to an aspect of the invention, the moisture absorbent may be disposed around the air hole.

According to an aspect of the invention, the moisture absorbent may be attached to the inside of the case at the air hole.

According to an aspect of the invention, the heat exchanger may be disposed at an opposite side of the air hole, interposing the moisture absorbent therebetween.

According to the exemplary embodiment of the present invention, the high-temperature high-moisture gas separated by the gas-liquid separator is passed through the moisture absorbent to absorb condensed water, and condensed water in the moisture absorbent is vaporized by supplying high-temperature dry air flow generated from the heat exchanger to the moisture absorbent to thereby prevent generation of condensed water at the external side of the fuel cell system. Since the high-temperature high-moisture gas separated by the liquid-gas separator is condensed in the moisture absorbent and then vaporized, the condensed water is not generated at the external side of the fuel cell system so that the performance deterioration of the constituent elements due to the condensed water can be prevented.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
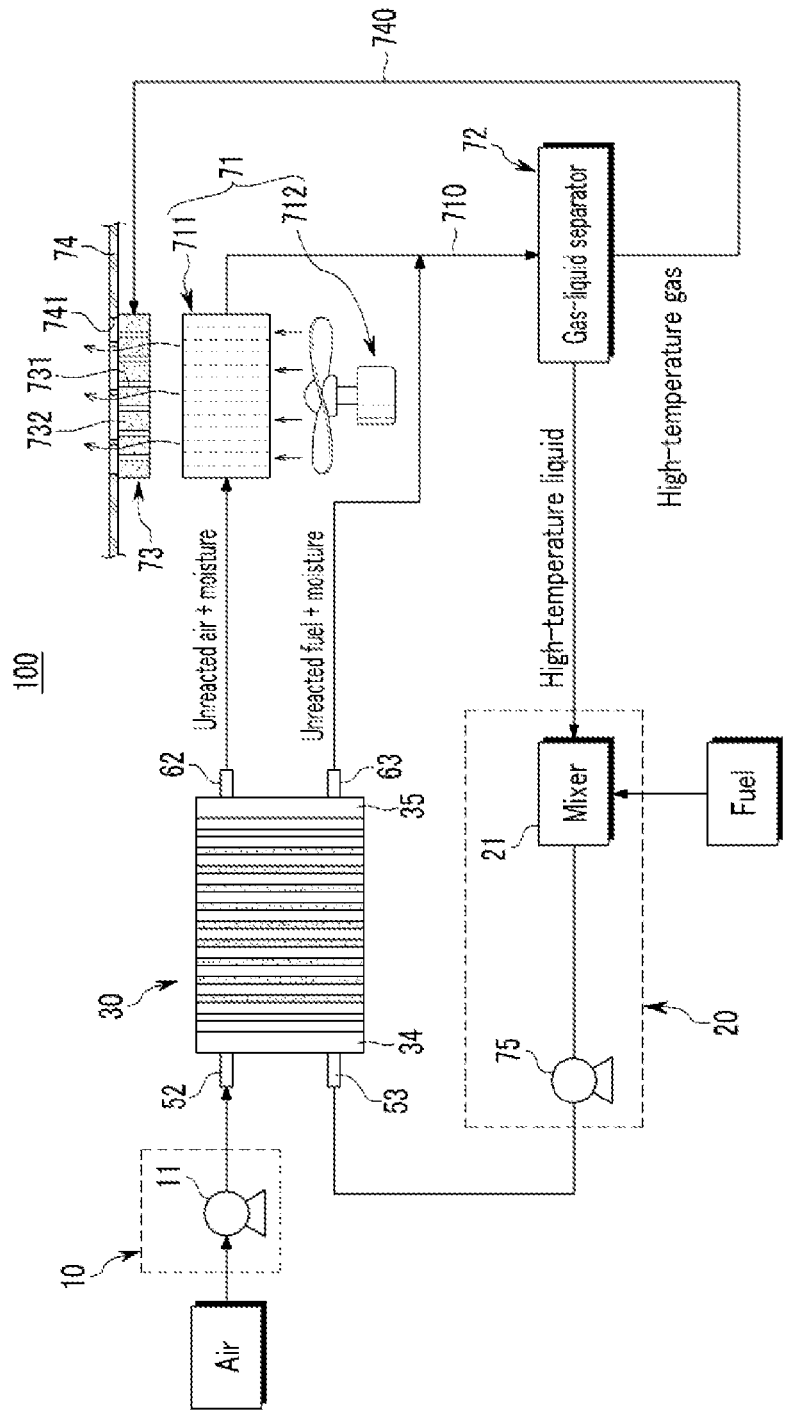
FIG. 1 is a schematic diagram of a fuel cell system according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic diagram of a fuel cell system 100 according to an exemplary embodiment of the present invention. Referring to FIG. 1, the fuel cell system 100 (hereinafter referred to as "system") includes an air supply unit 10 supplying air containing oxygen, a fuel supply unit 20 supplying a fuel containing hydrogen, and a stack 30 generating power and heat through electrochemical reaction of oxygen and hydrogen. The air supply unit 10 supplies air to the stack 30 by driving an air pump 11 and may further include a tank storing the air or merely draw the air through an inlet. The fuel supply unit 20 directly supplies a liquid fuel such as methanol through a mixer 21 by driving of a fuel pump 75 and can store the liquid fuel in a tank or received through a pipeline from an external source.

Figure 2:
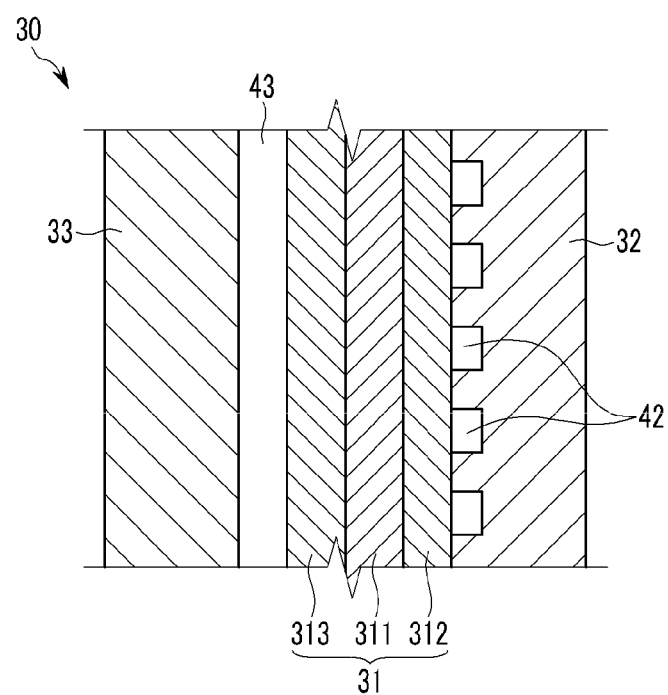
FIG. 2 is a partial cross-sectional view of a unit cell of a stack in FIG. 1 according to an exemplary embodiment of the present invention.

FIG. 2 is a partial cross-sectional view of a unit cell of the stack 30 of FIG. 1 according to an exemplary embodiment of the present invention. Referring to FIG. 2, the air and fuel supplied to the stack 30 generate a reduction reaction and an oxidation reaction while flowing through an air path 42 and a fuel path 43 that are independently formed in the stack 30. The stack 30 is formed by fastening at least one of the plurality of stacked unit cells with a fastening member (not shown). The unit cell includes a membrane electrode assembly (MEA) 31 formed of a cathode 312 and an anode 313 formed at lateral sides. A polymer electrolyte membrane (PEM) 311 is interposed between the cathode 312 and the anode 313. A cathode-side separator 32 is provided at the cathode 312 to define the air path 42. An anode-side separator 33 is provided at the anode 313 to define the fuel path 43.

That is, the cathode-side separator 32 defines the air path 42 while facing one side of the MEA 31, and the air is supplied to the MEA 31 by connecting the air path 42 to the air pump 11. The anode-side separator 33 defines the fuel path 43 while facing the other side of the MEA 31, and the fuel is supplied to the MEA 31 by connecting the fuel path 43 to the mixer 21 via the pump 75.

Referring back to FIG. 1, the stack 30 is sequentially provided with a current collecting plate (not shown) for collecting power at an external side of the last unit cell of the unit cells stacked at both sides, an insulator (not shown), and end plates 34 and 35. The insulator and the end plates 34 and 35 are provided for insulation or impact absorption. In the stack 30, the one end plate 34 takes the air and fuel therethrough. The other end plate 35 is formed and connected to discharge unreacted fuel and air and water generated inside the stack 30. For example, the end plate 34 placed in the left side in FIG. 1 is provided with an air path inlet 52 and a fuel path inlet 53. The air path inlet 52 is connected to the air pump 11, and the fuel path inlet 53 is connected to the mixer 21.

The end plate 35 is at the other side of the stack 30 and is provided with an air path outlet 62 and a fuel path outlet 63. The air path outlet 62 is connected to a main body 711 of the heat exchanger 71. The fuel path outlet 63 is connected to a gas-liquid separator 72. That is, the heat exchanger 71 is provided in an emission line 710 that connects the air path outlet 62 and the gas-liquid separator 72.

The air path inlet 52 and the air path outlet 62 are respectively connected to lateral ends of the air path 42 of the stack 30. The air path inlet 52 supplies air to the stack 30. The air path outlet 62 discharges unreacted air remaining inside the stack 30 and water generated therein.

The fuel path inlet 53 and the fuel path outlet 63 are respectively connected to lateral ends of the fuel path 43 of the stack 30. The fuel path inlet 53 supplies the fuel to the stack 30, and the fuel path outlet 63 discharges unreacted fuel remaining inside the stack 30 and water generated therein.

The heat exchanger 71 condenses high-temperature unreacted air and moisture discharged through the air path outlet 62. The unreacted air and moisture pass through the heat exchanger 71, and flow into the gas-liquid separator 72. In this case, the unreacted air and unreacted fuel flowing into the gas-liquid separator 72 are maintained in a high-temperature gas state, and moisture is maintained in a high temperature liquid state.

The gas-liquid separator 72 separates the high-temperature gas-liquid mixture emitted from the air path outlet 62 and the fuel path outlet 63 into high-temperature liquid and high-temperature high-moisture gas. Since the mixer 21 is connected to the gas-liquid separator 72, the separated high-temperature liquid is supplied to the mixer 21 and the high-temperature high-moisture gas is supplied to a moisture absorbent 73.

The mixer 21 mixes the fuel supplied from the fuel supply unit 20 and the separated high-temperature liquid supplied from the gas-liquid separator 72 according to driving of the fuel pump 75. The mixer 21 supplies the mixture to the fuel path 43 of the anode electrode 313. Therefore, high-temperature liquid (that is, water generated from the cathode electrode 312) is added to the water consumed by the anode electrode 313 to thereby increase the concentration of the fuel.

The fuel cell system 100 further includes a case 74. The case 74 houses the fuel supply unit 20, the air supply unit 10, the stack 30, the gas-liquid separator 72, the mixer 21, the moisture absorbent 73, and the heat exchanger 71. The case 74 forms the exterior of the fuel cell system 100, and has an air hole 741 formed at one side thereof to emit heat generated from the inside.

The moisture absorbent 73 is formed such that the separated high-temperature high-moisture gas supplied from the gas-liquid separator 72 pass through the moisture absorbent 73. The moisture absorbent 73 condenses the gas into a liquid, absorbs the condensed liquid, and vaporizes the absorbed liquid. While not required in all aspects, the shown moisture absorbent 73 is provided around the air hole 741 of the case 74 through which the high-temperature gas flows. In the shown example, the moisture absorbent 73 is attached to the inside of the case 74 at the air hole 741, but the invention is not limited thereto.

Although a separate heating element (not shown) may be used in order to vaporize the moisture condensed in the moisture absorbent 73, the heat exchanger 71 connected to the air path outlet 62 is exemplarily used in the present exemplary embodiment. Where the separate heating element is used, the heat exchanger 71 need not be used.

The heat exchanger 71 is disposed at one side of the moisture absorbent 73 near the air hole 741 and makes high-temperature and dry air pass through the moisture absorbent 73 so that the condensed liquid absorbed in the moisture absorbent 73 is vaporized and then emitted to the outside through the air hole 741. The heat exchanger 71 includes a main body 711 performing the heat exchange and a fan 712. The fan 712 is provided at one side of the main body 711 to blow low-temperature air through the main body 711 such that the air picks up heat through heat exchange with the main body 711, and high-temperature dry air flows out an opposite side thereof. Therefore, the main body 711 is between the moisture absorbent 73 and the fan 712 such that the moisture absorbent 73 faces the high-temperature dry air flow supplied from the heat exchanger 71.

The moisture absorbent 73 is provided with a plurality of ventilation holes 731 through which pass the high-temperature dry air from one side of the moisture absorbent 73 to the other. In addition, the moisture absorbent 73 has a microporous structure 732 between ventilation holes 731 for absorbing the condensed liquid and vaporizing the liquid to gas using the high-temperature dry air flowing through the ventilation holes 731. For example, the moisture absorbent 73 having the ventilation holes 731 and the microporous structure 732 may be formed of an absorptive fiber having the ventilation holes 731.

As described, the high-temperature moisture gas generated from the inside of the fuel cell system 100 is emitted to the outside of the air hole 741 of the case 74 as a high-temperature dry gas after the liquid is condensed out of the high-temperature moisture gas in the moisture absorbent 73, and the condensed liquid is vaporized by the high-temperature dry air flowing from the heat exchanger 71 so that generation of condensed water at the external side of the case 74 can be prevented. Further, performance deterioration of the constituent elements due to the condensed water can be prevented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell system comprising:
   a fuel supply unit which supplies a fuel containing hydrogen;
   an air supply unit which supplies air containing oxygen;
   a stack including a fuel inlet connecting a fuel path within the stack to the fuel supply unit, an air inlet connecting an air path within the stack to the air supply unit, and membrane electrode assemblies (MEAS), each MEA having a unit cell including an anode and a cathode separated by a polymer electrolyte membrane, and a pair of separators respectively forming the fuel path and the air path at the anode and the cathode;
   a gas-liquid separator connected to an outlet of the fuel path and an outlet of the air path and which separates a gas-liquid emitted from the air and fuel paths into a high-temperature liquid and a high-temperature moisture gas;
   a mixer which mixes the high-temperature liquid separated by the gas-liquid separator and the fuel supplied from the fuel supply unit and which is connected to the gas-liquid separator and the fuel inlet of the fuel path for supplying the mixture to the fuel path;
   a moisture absorbent connected to the gas-liquid separator and through which passes the high-temperature moisture gas separated by the gas-liquid separator to absorb liquid condensed from the high-temperature moisture gas; and
   a heat exchanger disposed at one side of the moisture absorbent to vaporize the liquid absorbed by the moisture absorbent by passing high-temperature dry air through the moisture absorbent.

2. The fuel cell system of claim 1, wherein the heat exchanger is provided at an emission line that emits the gas-liquid between the outlet of the air path and the gas-liquid separator.

3. The fuel cell system of claim 1, wherein the heat exchanger comprises:
   a main body which performs heat exchange which emits the high-temperature dry air from one side after a heat exchange is performed in the main body and which receives low-temperature air at an opposite side of the main body; and
   a fan provided at the opposite side of the main body which supplies the low-temperature air to the main body to be used in the heat exchange to produce the high-temperature dry air flow.

4. The fuel cell system of claim 3, wherein the moisture absorbent comprises ventilation holes through which passes the high-temperature dry air supplied from the heat exchanger.

5. The fuel cell system of claim 4, wherein the moisture absorbent further comprises a microporous structure formed between the ventilation holes for absorbing and vaporizing the liquid.

6. The fuel cell system of claim 1, wherein the moisture absorbent is formed of an absorptive fiber.

7. The fuel cell system of claim 1, further comprising a case which houses the fuel supply unit, the air supply unit, the stack, the gas-liquid separator, the mixer, the moisture absorbent, and the heat exchanger, the case including an air hole foamed at one side thereof.

8. The fuel cell system of claim 7, wherein the moisture absorbent is disposed in proximity to the air hole.

9. The fuel cell system of claim 7, wherein the moisture absorbent is attached to an inside of the case at the air hole.

10. The fuel cell system of claim 7, wherein the moisture absorbent is disposed between the heat exchanger and the air hole.

11. A fuel cell system comprising:
    a stack comprising membrane electrode assemblies (MEAs) which generate energy through an electrochemical reaction between a fuel and air, a fuel inlet through which the fuel passes into a fuel path within the MEAs, and an air inlet through which air passes into an air path within the MEAs;
    a gas-liquid separator connected to the fuel path and the air path and which separates a gas-liquid resulting from the electrochemical reaction into a high-temperature liquid containing the fuel which is introduced into the fuel inlet, and a high-temperature moisture gas; and
    a moisture absorbent connected to the gas-liquid separator and through which passes the high-temperature moisture gas and hot dry air, the moisture absorbent absorbing liquid condensed from the high-temperature moisture gas, and the absorbed liquid being vaporized by the hot dry air.

12. The fuel cell system of claim 11, wherein the moisture absorbent comprises a ventilation hole through which the hot dry air flows through the moisture absorbent.

13. The fuel cell system of claim 11, wherein the moisture absorbent comprises a microporous structure which absorbs the condensed liquid.

14. The fuel cell system of claim 13, wherein the moisture absorbent comprises an absorptive fiber having the microporous structure.

15. The fuel cell system of claim 14, wherein the moisture absorbent further comprises a ventilation hole through which the hot dry air flows through the moisture absorbent.

16. The fuel cell system of claim 11, further comprising a heat exchanger through which pass the gas-liquid and cooler dry air and which performs a heat exchange to heat the cooler dry air to form the hot dry air used by the moisture absorbent.

17. The fuel cell system of claim 11, further comprising a mixer which mixes the fuel received from a fuel supply with the high-temperature liquid containing the fuel received from the gas-liquid separator, and supplies the mixture into the fuel inlet.

18. The fuel cell system of claim 11, further comprising a case housing the stack, wherein the high-temperature moisture gas and hot dry air are exhausted outside of the case after passing through the moisture absorbent.

* * * * *

UNITED STATES PATENT AND TRADEMARK OFFICE
CERTIFICATE OF CORRECTION

PATENT NO. : 8,481,221 B2  
APPLICATION NO. : 12/759096  
DATED : July 9, 2013  
INVENTOR(S) : Seong-Kee Yoon et al.

Page 1 of 1

It is certified that error appears in the above-identified patent and that said Letters Patent is hereby corrected as shown below:

In the Claims

Column 5, Claim 1, line 61  Delete "(MEAS),"  
Insert -- (MEAs), --

Column 6, Claim 7, line 46  Delete "foamed"  
Insert -- formed --

Signed and Sealed this  
Second Day of December, 2014

Michelle K. Lee  
*Deputy Director of the United States Patent and Trademark Office*